United States Patent

[11] 3,577,205

[72] Inventor Gilbert L. Hobrough
Woburn, Mass.
[21] Appl. No. 508,779
[22] Filed Nov. 19, 1965
[45] Patented May 4, 1971
[73] Assignee Itek Corporation
Lexington, Mass.

[54] AUTOMATIC IMAGE MOTION STABILIZATION SYSTEM
5 Claims, 3 Drawing Figs.

[52] U.S. Cl. .......... 250/213, 95/12.5, 95/86, 350/16
[51] Int. Cl. .......... H01j 31/50
[50] Field of Search .......... 250/203, 213; 350/16; 88/1 (S); 95/12.5, 86; 178/6 (IND), 6.8, 7.2

[56] References Cited
UNITED STATES PATENTS

| | | | |
|---|---|---|---|
| 2,869,803 | 1/1959 | McGee | 178/6(IND) |
| 2,959,088 | 11/1960 | Rantsch | 350/16X |
| 3,212,420 | 10/1965 | Cierva | 95/12.5 |
| 3,293,360 | 12/1966 | Smith | 178/6.8 |
| 3,371,161 | 2/1968 | Crovella | 178/7.2 |
| 3,107,303 | 10/1963 | Berkowitz | 250/213VT |
| 3,455,221 | 7/1969 | Reekie | 95/12.5 |

*Primary Examiner*—James W. Lawrence
*Assistant Examiner*—C. M. Leedom
*Attorneys*—Stanley Belsky and Robert L. Nathans

ABSTRACT: An image motion stabilization system for use with telescopes, cameras, and the like. An inner casing containing an objective lens and an image converter is mounted within an outer support casing so as to be movable with respect thereto. Displacement of the outer casing with respect to the inner casing caused by vibration or movement produces a corresponding displacement of the electron stream in the image converter such that a stable image of a scene viewed by the objective lens will be presented to an ocular in the outer casing.

GILBERT L. HOBROUGH
INVENTOR.

BY Stanley Belsky
Robert L. Nathans

ATTORNEYS

AUTOMATIC IMAGE MOTION STABILIZATION SYSTEM

The present invention is directed to a new and improved image motion stabilization system.

In application Ser. No. 462,322, filed June 8, 1965 and assigned to the same assignee of the present invention, an image motion stabilization system is disclosed which eliminates image motion which would otherwise be produced owing to vibrations of support structure. For example, a hand held or helicopter mounted camera or telescope produces undesirable image motion or "dance" which is obviously very undesirable. The systems disclosed in the aforesaid application eliminates this image motion by gyroscopically sensing angular displacements of the support structure and controlling deflection circuitry associated with an image converter or intensifier in a manner to counteract the image motion which would be otherwise manifested, owing to support vibrations. More specifically, movement of the electron stream within the image converter owing to these vibrations is prevented by applying electrical forces to the electron stream proportional to the angular vibrational displacements sensed and hence to image displacements. Since these forces are counteracting in nature, motion of the electron stream, and thus the optical image produced by the luminescent screen, is eliminated. X and Y direction rate gyros together with associated integration circuits produce the displacement signals which are applied to electromagnetic deflection coils positioned about the image converter. However, the use of gyroscopes and related circuitry entails considerable expense so that the cost of small telescopes, cameras and viewers might preclude their widespread distribution.

Accordingly, it is the principal object of the present invention to provide a new and improved image motion stabilization system that is particularly useful in conjunction with small hand held cameras, telescopes and viewing devices.

It is a further object of the present invention to provide a new and improved image motion stabilization system that is inexpensive to manufacture, rugged and highly reliable since a minimum of components are utilized.

Other objects and advantages will become more apparent from the following detailed description taken in conjunction with the accompanying drawings in which:

FIG. 1 discloses a cross-sectional view of a preferred embodiment of the present invention.

In accordance with the present invention an inner case containing an objective lens and an image converter is affixed by means of a gimbal to an outer case which has an ocular positioned at one end thereof. The viewed scene is focused upon the photoemissive screen of the converter by the objective, and an electron stream corresponding to the scene is produced by the photoemissive screen and is focused by an electron lens system upon a phosphor screen, which in turn produces an optical replica of the scene to be presented to the ocular. X and Y direction angular vibrational displacements of the outer case with respect to the inner case cause electrical currents to be produced in X and Y deflection coils which in turn produce counteracting movement of the electron stream in a direction and to an extent to stabilize the image viewed through the ocular. Inexpensive potentiometers are utilized to control the deflection coil currents. Mechanical low pass filters eliminate possible shifting of the scene produced on the phosphor screen which could otherwise occur during panning of the device. Additionally, the inner case is gimballed at its center of gravity to eliminate any affect on the system due to strictly translational movements of the outer case.

Figure 1:
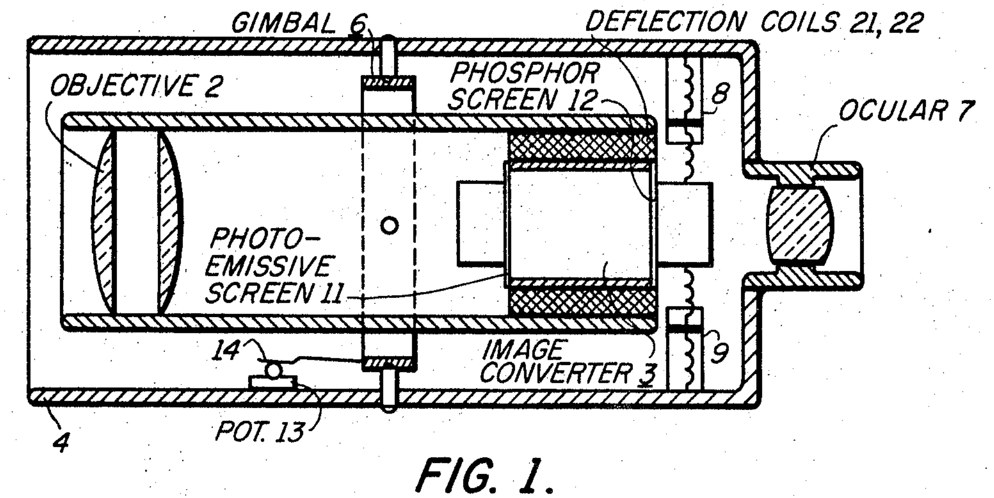

FIG. 1 discloses an inner cylindrical case 1 bearing an objective lens system 2 and image converter 3. Inner case 1 is gimballed to outer case 4 by means of gimbal 6. Outer case 4 has an ocular 7 positioned within one end thereof. Inner case 1 is further connected to outer case 4 by means of mechanical low pass filters 8 and 9 and another pair of filters not shown. Image converter tube 3 comprises a photoemissive screen 11 formed at one end thereof and a luminescent phosphor screen 12 formed at the other end thereof. Image converter 3 is evacuated and contains a conventional electron lens system (not shown). The viewed scene is focused by objective lens system 2 upon photoemissive screen 11. In a manner well understood by those skilled in the art, photoemissive screen 11 emits a plurality of electrons at a particular incremental area of the screen struck by a photon and, accordingly, an electron stream is produced within the evacuated image converter 3 which is a replica of the optical image focused upon the photoemissive screen 11. As well understood, the electron lens system refocuses the electron stream upon phosphor screen 12, thereby to reconvert the electron image back into an optical image which is viewed by ocular 7. The inner case is gimballed to the outer case at the center of gravity of the inner case so that strictly translational movements of the outer case will not be detected by the potentiometers, whose function will be explained hereinafter. In the absence of further structure, angular vibrational movements of the outer case will cause the outer case to become displaced with respect to the inner case generally in both the X and Y directions and as a result the image viewed through ocular 7 will gyrate which, of course, produces the aforesaid undesirable image motion.

Let it be assumed that the outer case becomes displaced in the X direction with respect to the inner case. This will cause a change in the setting of potentiometer 13 since the resistance element of the potentiometer is affixed to outer case 4 while the movable brush 14 is affixed to the gimbal 6 as shown. As a result thereof, an electrical current change is produced in the horizontal deflection coils which surround the image converter 3 in a direction to shift the electron stream horizontally to in turn shift the optical image produced upon phosphor screen 12 in a direction and to an extent to counteract the motion of the optical image which would otherwise occur in ocular 7.

Figure 2:
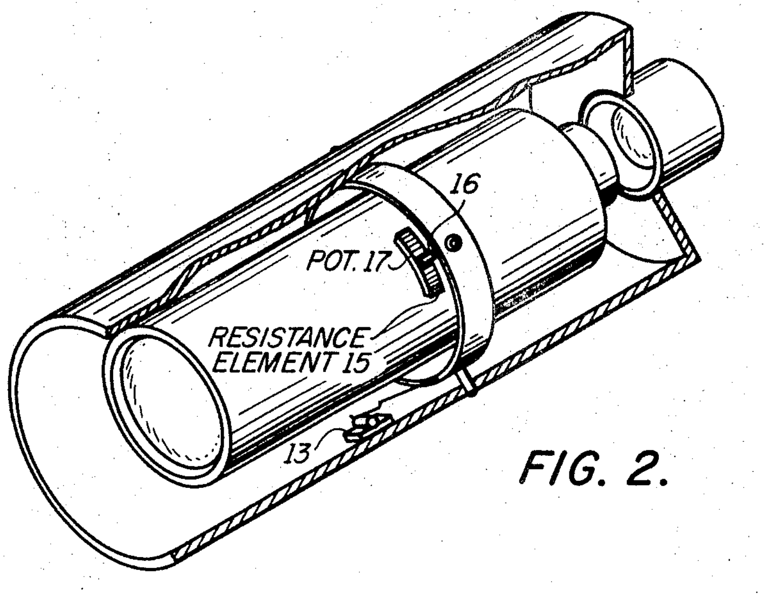
FIG. 2 illustrates the vertical displacement sensing potentiometer.

FIG. 2 schematically discloses the Y direction potentiometer which will cause currents flowing through the Y direction deflection coils to change in accordance with Y directional displacements between the outer and inner case. Y directional displacements of the outer case will be transmitted through gimbal 6 to the brush 16 of Y direction potentiometer 17. As the resistance element 15 of potentiometer 17 is affixed to inner case 1 as shown in FIG. 2, the setting of potentiometer 17 will be proportional to Y directional displacements.

Figure 3:
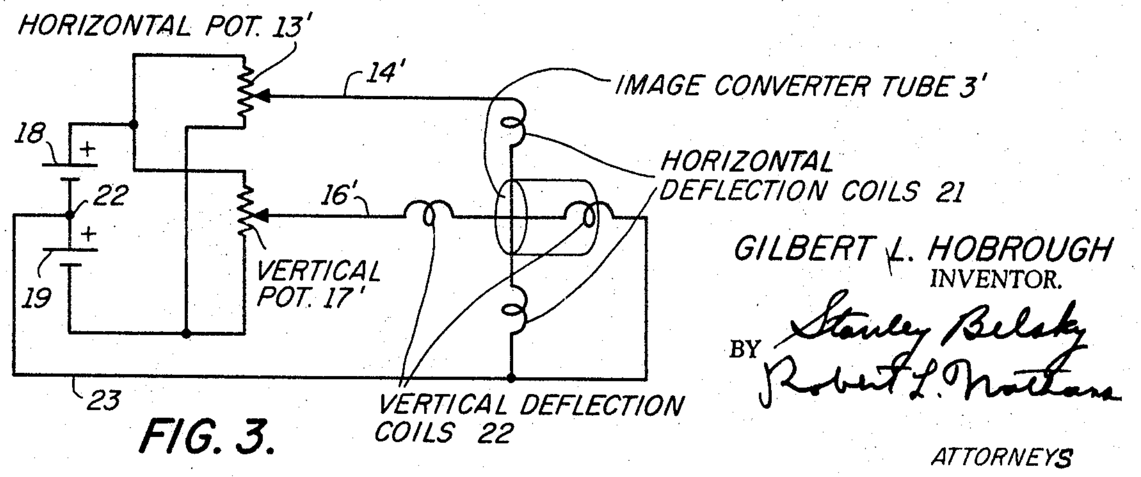
FIG. 3 illustrates an electrical circuit utilized in the preferred embodiment.

FIG. 3 discloses the electrical circuit which will aid in a more complete understanding of the operation of the preferred embodiment of the present invention. Horizontal sensing potentiometer 13′ is connected as shown across series connected voltage sources 18 and 19. Likewise, Y direction vertical sensing potentiometer 17′ is coupled across voltage sources 18 and 19 as shown in FIG. 3. Brush 14′ is coupled to one terminal of push-pull horizontal deflection coil unit 21 while brush 16′ is coupled to one terminal of the Y direction vertical deflection push-pull coil unit 22. The remaining terminals of the deflection coils are returned to junction 22 by means of conductor 23 as shown in FIG. 3. The stiffness of the springs of Y direction mechanical low pass filters 8 and 9 and the stiffness of the springs of the X direction mechanical low pass filters (not shown) are balanced such that ground potential exists on brushes 14′ and 16′ and, accordingly, no current flows through the X and Y direction deflection coils 21 and 22 when the system is at rest. A sudden shift of the outer case in the +X horizontal direction will cause, for example, a positive potential to be produced on the X or horizontal potentiometer brush 14′ so as to cause the shift of the electron stream within image converter 3 in the opposite or −X direction. On the other hand, should the shift of the outer case be in the −X direction, a negative voltage will be impressed upon 14′ so that the current flow through the horizontal coils 21 is reversed thereby to shift the electron stream in the +X direction. The greater the magnitude of shift of the outer case, the greater will be the current flow and, accordingly, the greater the compensatory movement imparted to the electron stream by the horizontal deflection coils. In an analogous manner, the vertical or Y sensing potentiometer 17 will produce current flow to effect a vertical or Y shift in the electron stream within the image converter.

As a result, it should now be apparent that random vibrational motion of the outer case with respect to the inner case, which in general will have both X and Y directional components, will produce current flows corresponding to said displacements in the deflection coils which will effect stabilization of the image viewed through ocular 7.

The mechanical low pass filters comprise mass-spring combinations as illustrated. In a manner well understood, mass and spring stiffness parameters may be selected to that the combinations transmit frequencies below a particular cutoff frequency. In the absence of the filters, panning or sweep positioning of the device might cause relative movement of the potentiometer wipers with respect to their associated resistance elements which would result in undesirable image shifts upon the face of the image converter during panning. Panning frequencies may generally be characterized as being one or two cycles per second or less. This is particularly true where angular accelerations are high. Thus, the filters are designed to transmit frequencies below one cycle so that during panning the inner case will be "pulled along" by the panning movement of the outer case and no signal will be transmitted to the deflection circuitry to cause the aforesaid image shift. On the other hand, the frequency components involved in the support structure vibrations are substantially above one cycle per second and will not be transmitted by the filter so that the appropriate potentiometer signals may be generated to effect image stabilization as previously explained.

By gimballing the inner case at its center of gravity, strictly translational movements of the device, which are generally no problem, are not converted into angular displacements of the inner case. However, the invention in its broadest sense is not to be restricted to compensation of angular displacements only as the inner case could obviously be spring suspended to detect translational vibrations also.

An embodiment of this invention in its broadest sense could be effective utilizing the electrical current changes to move an optical element such as a lens to in turn create compensatory image shifts. However, such an optical element with its mechanical drive means would possess inertia in contrast with the electron stream, and would thereby tend to limit the frequency response.

While there has been described what is at present considered to be the preferred embodiment of this invention, it will be obvious to those skilled in the art that various changes and modifications may be made therein without departing from the invention and it is, therefore, intended in the appended claims to cover all such changes and modifications as fall within the true spirit and scope of the invention.

I claim:

1. An image motion stabilization system comprising:

I. an inner structure, said inner structure including:
   a. optical image forming means;
   b. photoemissive means for receiving said optical image and generating an electron image representative of said optical image;
   c. a luminescent surface for receiving said electron image and reconverting said electron image back into an optical image; and
   d. deflection means for deflecting the electron image produced by said photoemissive means;

II. an outer structure having means associated and movable therewith for receiving the image produced by said luminescent surface;

III. means for mounting said inner structure within said outer structure and for allowing said outer structure to be readily angularly displaced with respect to said inner structure; and IV. variable impedance means coupled between said inner and outer structures and responsive to displacement of said outer structure with respect to said inner structure for controlling said deflection means to deflect said electron image in a direction and to an extent necessary to substantially eliminate image motion which would otherwise be produced at the image receiving means of said outer structure due to said displacement.

2. An image motion stabilization system as recited in claim 1 wherein said mounting means comprises gimbal means and wherein said variable impedance means comprises potentiometer means having a resistance element affixed to said outer structure and a movable brush element affixed to said gimbal.

3. An image motion stabilization system as recited in claim 1 wherein said mounting means mounts said inner structure within said outer structure at the center of gravity of said inner structure.

4. An image motion stabilization system as recited in claim 1 wherein at least one mechanical low pass filter is coupled between said inner and outer structures.

5. An image motion stabilization system as recited in claim 1 wherein said deflection means comprises first and second deflection coil means for deflecting said electron image along first and second directional lines, respectively; and wherein said variable impedance means comprises first and second potentiometer means responsive to displacement of said outer structure with respect to said inner structure along said first and second directional lines, respectively, for controlling said first and second deflection coil means, respectively.